United States Patent [11] 3,581,273

| [72] | Inventor | Ronald M. Hedberg |
| | | 18 Whittier St., Cambridge, Mass. 02140 |
| [21] | Appl. No. | 875,510 |
| [22] | Filed | Nov. 10, 1969 |
| [45] | Patented | May 25, 1971 |
| | | Continuation of application Ser. No. 645,643, June 13, 1967. |

[54] MARINE SEISMIC EXPLORATION
13 Claims, 13 Drawing Figs.

[52] U.S. Cl. .................................................. 340/7PC, 114/237, 181/0.5VM, 340/15.5MC
[51] Int. Cl. .................................................. G01v 1/38
[50] Field of Search .................................................. 340/7, 15.5 MRC; 114/237; 181/.5 VM

[56] References Cited
UNITED STATES PATENTS

| Re25,204 | 7/1962 | Becker | 340/15.5 |
| 3,019,412 | 1/1962 | Crawford | 340/7 |
| 3,325,778 | 6/1967 | Ballard | 340/7 |
| 3,331,050 | 7/1967 | Kilmer et al. | 340/7 |

Primary Examiner—Richard A. Farley
Assistant Examiner—Daniel C. Kaufman
Attorney—Sperry and Zoda ABSTRACT: Continuous marine seismic explorations are carried out by providing echo detecting means with control means for maintaining the echo detecting means in fixed or predetermined positions and at spaced points in two dimensions of a horizontal plane, and by generating echo producing impulses at one or more spaced points located in fixed or predetermined relative positions with respect to each other and in said plane. In this way, a set of records may be obtained which define the seismic interfaces of the prospect under survey in two intersecting vertical planes. Thereafter, by producing successive sets of such records, quadratic surfaces in which the true inclinations of interfaces may be determined over an extended area are obtained in a single traverse thereof. At the same time, the accuracy of the records obtained is materially increased.

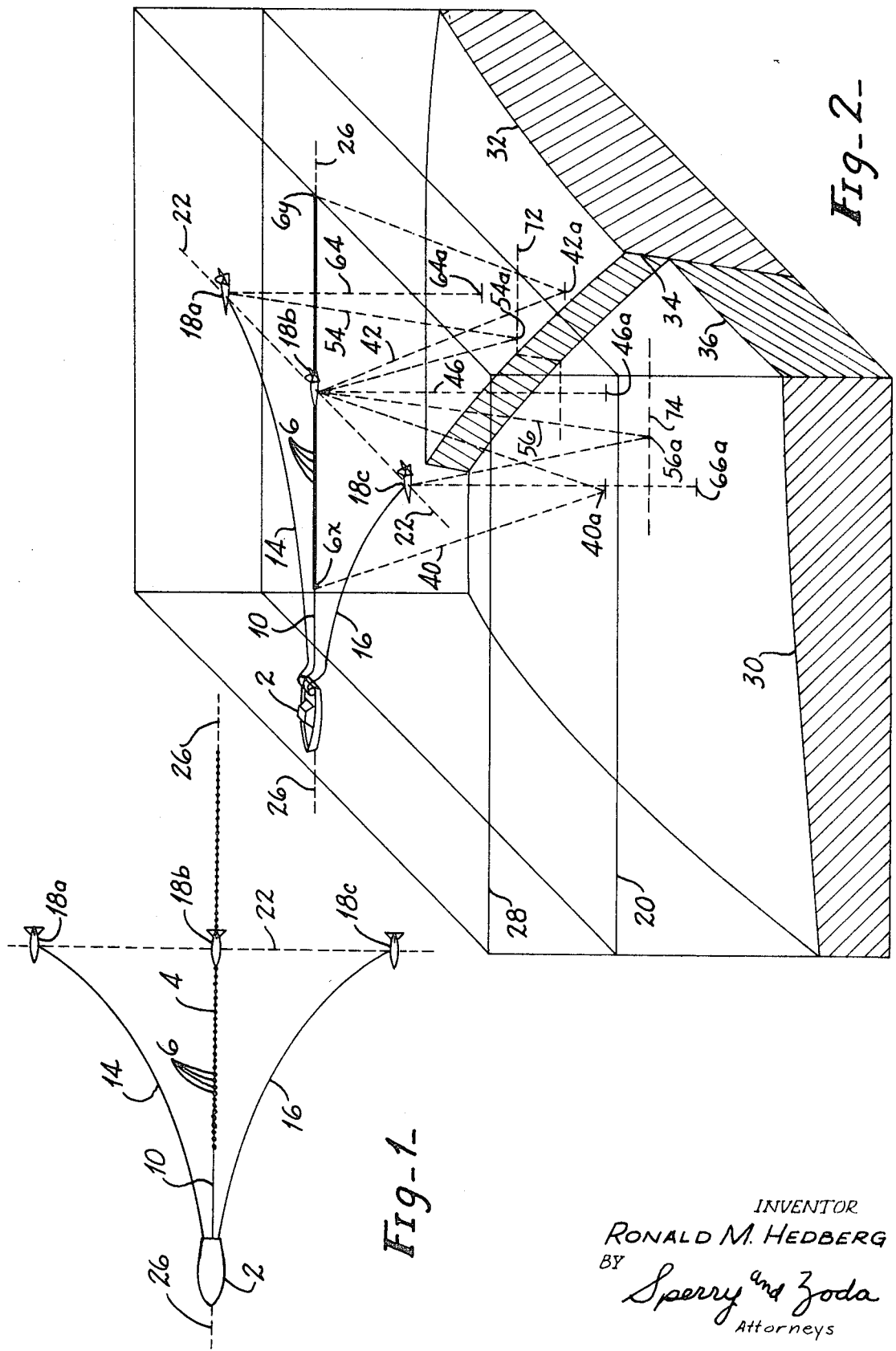

INVENTOR
RONALD M. HEDBERG
BY Sperry and Zoda
Attorneys

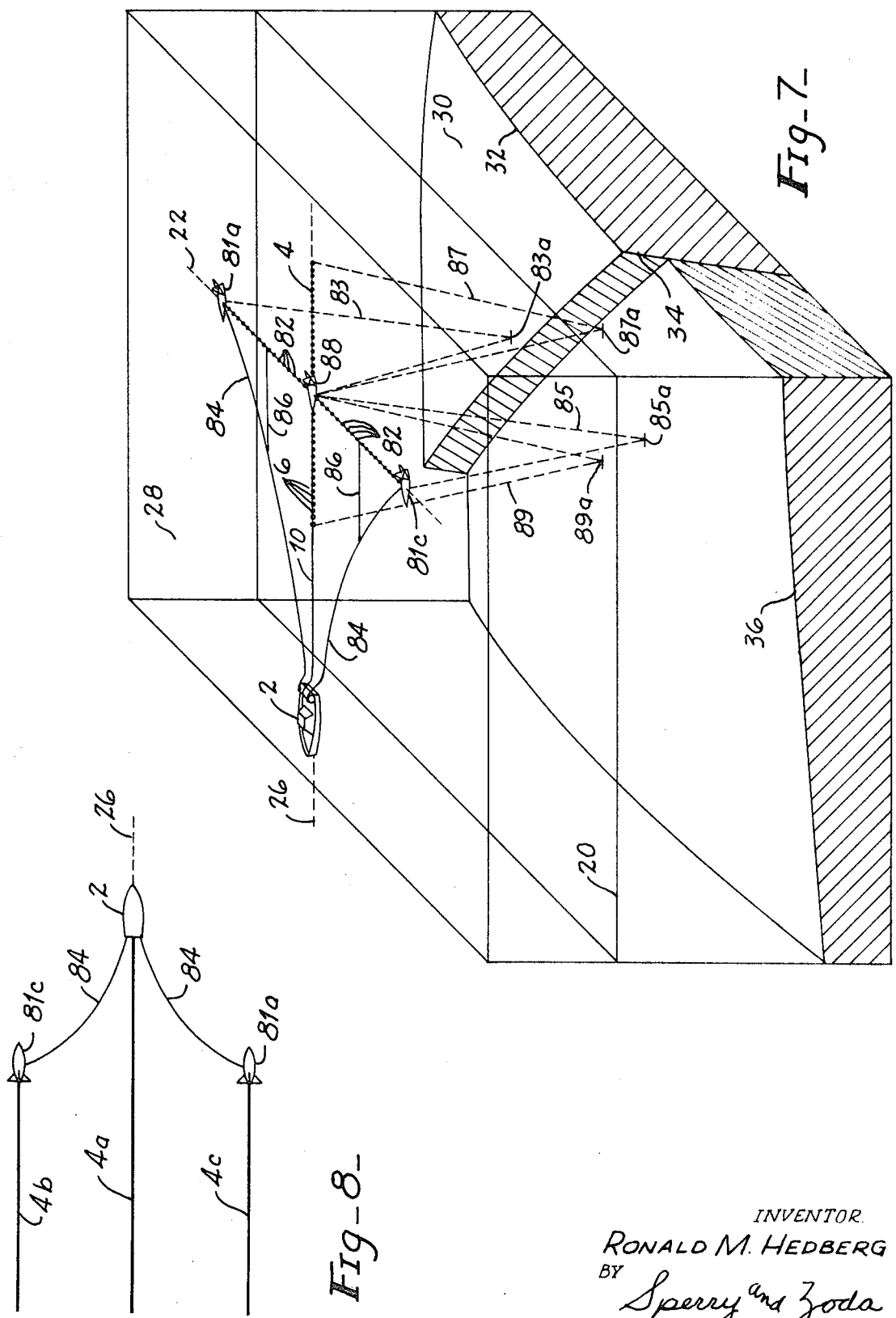

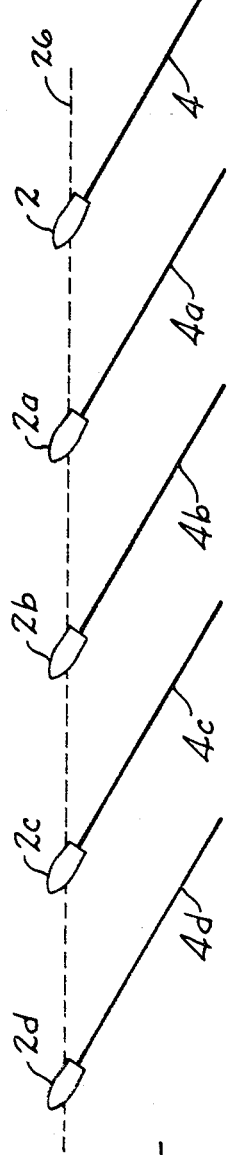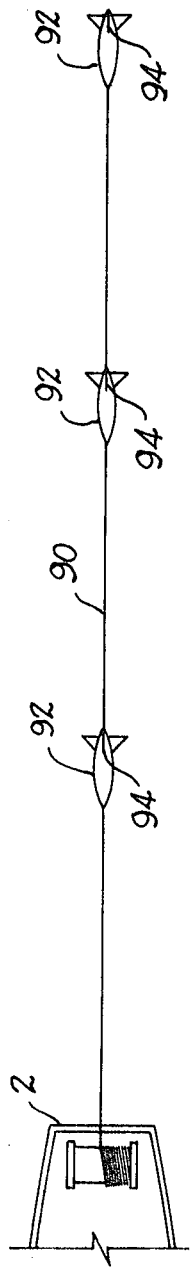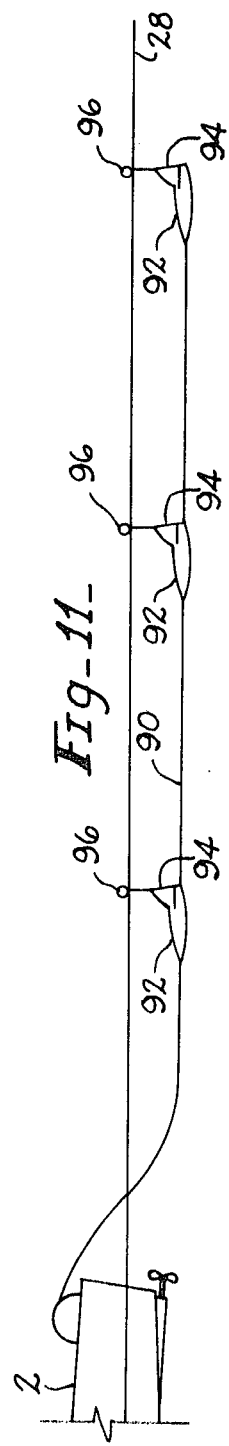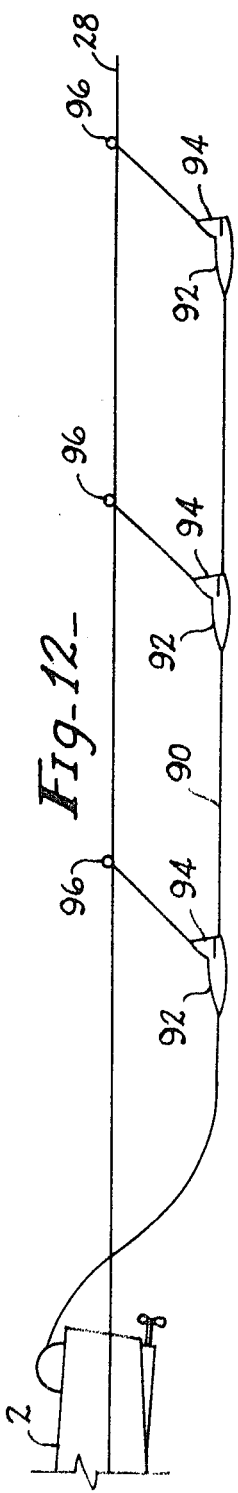

MARINE SEISMIC EXPLORATION

RELATED APPLICATION

This application is a continuation of copending application Ser. No. 645,643, filed June 13, 1967.

Preferred equipment used for obtaining such records includes steerable means such as paravanes for maintaining the impulse generating devices and echo responsive elements in known or predetermined relative positions when producing the successive sets of records. Furthermore, when inscribing such records, the individual records of each set may be brought into registry with each other so as to facilitate correlation and interpretation of the records obtained.

BACKGROUND OF THE INVENTION

1. Field of Invention

This invention relates to methods and means for use in marine seismic exploration and is directed particularly to systems and equipment whereby records may be obtained to indicate the profile of the area under survey as a series of substantially vertical orthogonal sections proceeding in the direction in which said area is traversed.

2. Description of the Prior Art

It has been common practice heretofore to carry out marine seismic surveys by employing a number of hydrophones that are connected by electrical conductors to recording equipment, and are towed behind a boat moving over the area to be surveyed. The hydrophones are thereby stretched out in a straight line or "spread," after which an echo producing impulse, such as an explosive blast, spark or the like, is generated at a point along or beside the spread of hydrophones. The resulting echoes from the surface and underlying strata are recorded to indicate the profile and/or character of the area being surveyed.

Such systems serve to produce a record which indicates the profile of the strata in a single, substantially vertical plane beneath the "spread" and it is therefore necessary to traverse the area under survey repeatedly in order to obtain a complete record of the area and a clear indication of the various slopes, inclinations, and contours of the bottom and underlying strata in the area. Even then the records obtained are frequently limited and inaccurate and present difficult problems in the coordination and reconciling thereof. Typical methods and equipment heretofore suggested for use in marine seismic surveying are those shown and described in the following U. S. Pats.:

Paslay 2,456,696
Paslay et al. 2,729,300
Hersey et al. 3,065,815
Loper et al. 3,124,781
Strange 3,133,262
Roever 3,189,870

In some instances "cross-spread" arrangements of impulse generating means and geophones have been used in seismic prospecting on land. However, cross spreads in marine areas have not heretofore been practical because of the problems of handing a main cable of the requisite length, and because of the transverse spread required to obtain meaningful results; the problems of deploying such an array and the problems of adapting cross spreads to a "continuous profiling" operation. Frequent displacement of the elements in marine areas with respect to each other during the survey and under the influence of ocean currents, tides, wave motion and other forces, as well as the surveying problems of knowing the exact location of an intersection of individual profiles, have compounded the above problems.

SUMMARY OF THE INVENTION

In accordance with the present invention, improved and more complete records indicating the structural configuration in three dimensional space of an area under marine survey are obtained rapidly and accurately by locating and maintaining the hydrophones or other echo responsive means at predetermined points spaced apart in two directions to provide a "cross spread" within a horizontal plane. For this purpose the equipment used preferably also includes means for maintaining the impulse generating and echo receiving means in such fixed or predetermined relative positions during survey as to assure the accuracy of the records produced, and may if desired embody means for controlling the record producing means so as to compensate for any dislocation or deviation of the impulse generating and echo producing means from such predetermined positions.

Accordingly, it is possible to generate a set of echo producing impulses from which accurate records may be obtained by energizing one or more impulse sources located at the desired and predetermined points which may be spaced with respect to each other in two directions in a horizontal plane above the area under survey. When such sources are energized successively and in such a manner as to permit a separate record of the echo or reflected waves derived from each of the spaced impulse sources to be produced, or to permit resolution of the reflections from a single impulse source into two distinct nearly vertical planes containing the points of reflection, so that these planes are oriented at a substantial angle to each other, or so that these planes are widely spaced, it is then possible to survey the area with greatly increased speed and accuracy. Thus, each record of the set of echoes obtained from multiple sources will indicate the profile of the area and strata under survey in a substantially vertical plane passing through the echo producing strata. Because the separation of the reflection points is sufficient to permit resolution of the positions of seismic horizons outside the plane of traverse of the survey ship, the true inclination of reflecting strata may be determined. Repeated sets of such records obtained by repeated operations carried out in a single traverse of the area under survey will thus serve to indicate the structural configuration of the entire area with greater accuracy than has been possible heretofore.

The equipment employed in accordance with the present invention further serves to coordinate the individual records of each set of impulses whereby the nature of the structure indicated by any set of impulses can be quickly and easily determined.

BRIEF DESCRIPTION OF THE DRAWING

FIG. 1 is a diagrammatic top plan view of one arrangement of impulse producing and echo receiving means embodying the present invention;

FIG. 2 is a block diagram illustrating the manner in which the equipment of FIG. 1 is employed;

FIG. 7 is a block diagram similar to FIG. 2 indicating the manner in which the equipment of FIG. 6 operates;

FIG. 8 is a diagrammatic plan view of a further alternative arrangement of elements embodying the present invention;

FIG. 9 is a diagrammatic illustration of a condition which may be encountered in the prior art;

FIG. 10 is a plan view of a part of the equipment of the present invention;

FIGS. 11 and 12 are side views of alternative embodiments of that part of the equipment shown in FIG. 10.

DESCRIPTION OF THE PREFERRED EMBODIMENT

Figure 3:
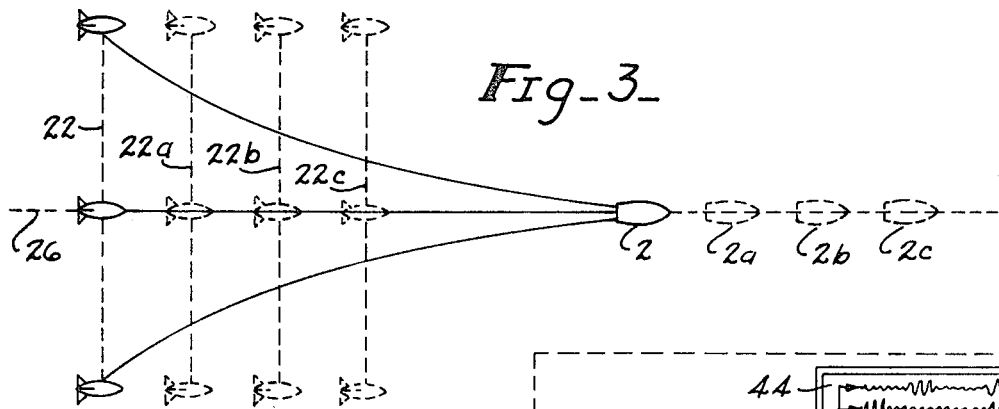
FIG. 3 is a plan view of the block illustrated in FIG. 2.

In that form of the invention chosen for purposes of illustration in FIGS. 1 to 5 and 13 of the drawings, the surveying equipment is moved continuously over an area to be surveyed by means of a boat or other towing means 2 from which a "spread" 4 of hydrophones or other echo responsive elements 6 extend rearwardly in a straight line. The hydrophones 6 may be of any suitable or preferred type and the spread 4 may be of a usual form including from, say, 96 to 120 hydrophones per group and comprised of several groups that are connected by electrical conductors in cable 10 to a recording equipment 12, carried by the boat 2.

In accordance with the present invention, at least one, and preferably two, additional cables 14 and 16 are towed by the boat 2 and as shown in FIG. 1, these cables are caused to spread outward at opposite sides of cable 10 by means of paravanes 18a and 18c respectively. In a similar way, a paravane 18b may be connected to the cable 10 of the spread 4. Each paravane is provided with rudders or other steerable means which are operable to maintain the paravanes in substantially fixed, or predetermined positions with respect to the other paravanes of the assembly. The paravanes 18a, 18b, and 18c may thus be located and controlled so as to take up positions which may be a quarter mile or more apart and positioned so as to define a line 22 extending transversely, and preferably at right angles, to the cable 10 and at right angles to the direction of transverse of the assembly over the area under survey.

Figure 13:
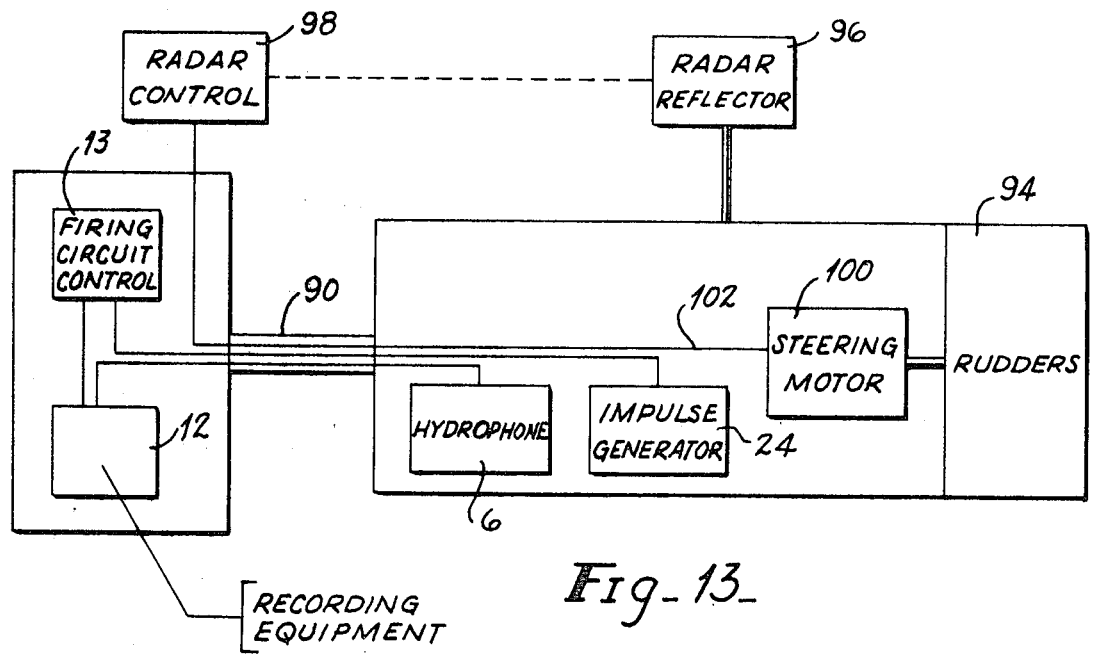
FIG. 13 is a diagrammatic illustration of one type of control system which may be employed in the practice of the present invention.

Each of the paravanes 18a, 18b and 18c may be constructed, as shown diagrammatically in FIG. 13, so as to position, or be provided with, an echo responsive element, designated 6, and also to position or be provided with an impulse generating device, designated at 24. For purposes of illustration and discussion it is hereafter indicated that each paravane 18a, 18b and 18c has an echo responsive element 6 and an impulse generating device 24 carried thereby. The impulse generating devices may be of any suitable or preferred type such as a gun for exploding gas or other combustible charges, or a device for producing an electric arc, or striking an anvil and if desired, the impulse generating device may be allowed to drift along its cable to the paravane thereon to cause it to be actuated. However, for most purposes, it is preferable to actuate the impulse generating devices and to receive the reflected or echo responses by means of electrical connections through cables 10, 14 and 16. In any event, the present invention employs an arrangement wherein the echo responsive elements are located at fixed or predetermined points spaced apart in two directions within a substantially horizontal plane above the area under survey whereas the impulse generating devices are located at one or more spaced and predetermined points with respect to at least some of the echo responsive elements to establish an effective "crossspread" arrangement of the elements which may be moved continuously over the area under survey in carrying out the survey.

As shown by way of illustration in FIGS. 1, 2 and 3, the equipment may be towed along a survey line 26 by a boat 2 floating on the surface 28 of the ocean or other body of water. For simplicity of presentation, the area under survey is represented as overlying a single seismic interface 30 including an upthrown block 32, a transverse fault plane 34, and a downthrown block 36, all of which are located some distance below the ocean floor 20. The spread of echo responsive elements 6 on cable 10 extend in a straight line behind the boat 2 and are held on the survey line 26 by the paravane 18b, whereas cables 14 and 16 are caused to spread out laterally from the cable 10 by the paravanes 18a and 18c until they are spaced apart a distance of, say one-quarter to one-half mile, or sufficient to permit separate recording of echoes from points in the area under survey which are spaced apart transversely of the line of transverse without confusion or suppression of such echoes in the records produced. When the cables and paravanes, with their impulse generating devices and echo responsive elements are thus deployed, the impulse generating devices are fired in a predetermined manner to obtain a set of records from the echo responsive means.

In a typical operation, the impulse generating devices 24 associated with the paravanes 18a, 18b and 18c may be actuated one after the other in a known sequence with a delay between the shots as the spread is moved over the area under survey. The delay between successive impulses need only be about 1 to 10 seconds or sufficient to prevent confusion in the records as to which generating devices 24 produce a given trace on the recording equipment 12. This is effected through the coordination of the firing circuit control device 13 and the recording equipment 12. Thus, the device 24 associated with the paravane 18b located on or adjacent cable 10 may be detonated or otherwise actuated to produce elastic waves that spread downward and outward in all directions. The waves represented by the limiting rays 40 and 42 are reflected from the points 40a and 42a on the seismic interface and are received as echoes by the hydrophones 6x and 6y respectively on cable 10. In this way a record is caused to be produced in the conventional manner of the prior art upon an instrument 44 of the recording equipment 12.

Figure 4:
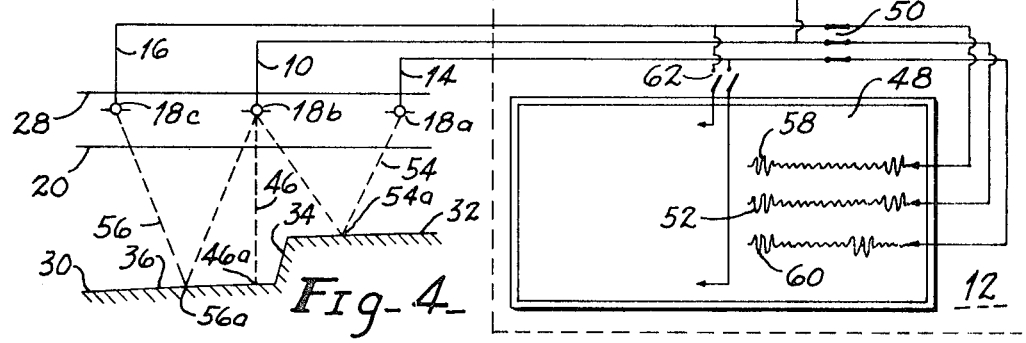
FIG. 4 is a diagrammatic illustration of recording equipment adapted for use in accordance with the present invention.
Figure 5:
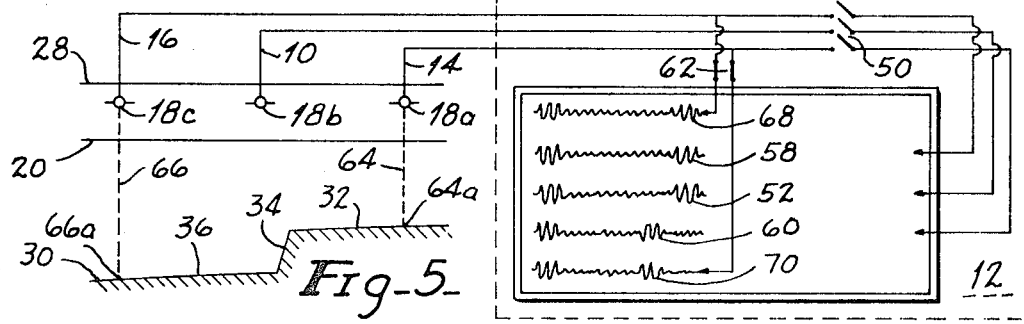
FIG. 5 is a view similar to FIG. 4 illustrating a further step in the recording of impulses in accordance with the present invention.

At the same time, the vertical ray 46 will be reflected from the point 46a on the interface and may be received by the echo responsive element 6 which is on or adjacent the paravane 18b. The latter echo responsive element is connected to instrument 44 and additionally to an instrument 48 of the recording equipment 12 by a switch 50 and thereby serves to produce the central trace 52 on the record of instrument 48 as shown in FIG. 4. In a like manner and at the same time, the inclined rays 54 and 56 generated by the device 24 associated with the paravane 18b will be reflected from the points 54a and 56a on the seismic interface to the echo responsive elements 6 associated with the paravanes 18a and 18c respectively. The dominant echoes thus reflected will serve to produce the two traces 58 and 60 on the record of instrument 48 as shown in FIG. 4. "Normal move-out corrections" for the slant ray path are applied later in the data processing phase. When the dominant reflections of the elastic waves thus generated by the device 24 of paravane 18b have attenuated sufficiently, switch 50 of instrument 48 is opened and switch 62 is closed. Shots are then fired by the impulse generating devices 24 associated with the paravanes 18a and 18c respectively and the rays 64 and 66 reflected vertically from the points 64a and 66a on the interface serve to actuate the echo responsive elements 6 associated with paravanes 18a and 18c to cause the additional traces 68 and 70 to be recorded by the instrument 48 as shown in FIG. 5. Furthermore, if the paravanes 18a and 18c are so closely spaced with respect to the desired depth of penetration as to interfere with each other, it is then desirable to fire and receive reflections from paravane 18a, with sufficient time for attenuation before firing at paravane 18c. In any event, the operations of the firing and recording equipment are so synchronized that the shot instants recorded by the traces 52, 58 and 60 first produced on the instrument 48 are caused to register with the traces 68 and 70 provided on said instrument by subsequent shots. In this way the successive traces are brought into parallelism so as to simplify the relating of the various traces with respect to each other.

When such a set of tracings is completed, the switch 62 is opened and switch 50 is again closed whereby the equipment is restored to its original condition for repeating the cycle of operations. The cycle is repeated at predetermined intervals or as often as desired while the boat 2 and the assembly of impulse generating and responding means travel along the survey line 26 as shown in FIGS. 2 and 3. Each record produced as described above and as shown in FIG. 5, serves to indicate the profile and nature of the seismic interface taken on a substantially vertical orthogonal plane passing through the line 22 at right angles to the survey line 26 along which the assembly is towed. The successive records obtained by repeating the cycle of operations correspond to successive vertical sections taken on the line 22a, 22b, 22c, etc. of FIG. 3 and will be spaced apart distances lengthwise of survey line 26 which are dependent upon the speed of travel of the boat 2 and its array of sound generating devices and echo responsive elements and the frequency at which the successive cycles are initiated. At the same time, the recording instrument 44 serves to produce a record of the profile of the seismic interface as represented by a vertical plane passing through the cable 10 of the conventional hydrophone spread 4. As a result, the two records obtained indicate profiles at right angles to each other and afford much more complete information which, in turn, permits more accurate interpretation regarding the seismic interface than has been possible of attainment heretofore. Thus the data so obtained permits determination of true inclinations of the seismic interface and the azimuth of linear features. Moreover, all this information is obtained by a single traverse of the area under survey whereby much less time is required for completing the survey of any desired plot or zone under investigation.

The systematic and coordinated operation of the equipment described above may be attained by the use of any suitable or preferred control mechanism, such as that set forth in U.S. Pat. No. 3,065,815 for example. Further, although the equipment shown and described herein employs analog recording on paper, it is well known in the art to employ other recording means and methods such as magnetic tape or the like adapted for use in conventional data processing systems.

The method of determining and recording the character of a seismic interface may be varied if desired. Thus, for example, after recording the dominant reflections resulting from a shot or impulse generated at 18b, the cable 10 can be connected to a different recorder and a single shot or "broadside" generated at 18a. The data obtained and recorded as received from the hydrophones of the spread 4 and cable 10 can then be electronically processed to give stacked continuous profile representative of a plane passing nearly vertically through the line 72 from which elastic waves from the source 18a are reflected to the hydrophones 6 on cable 10.

In a similar way, elastic waves may be generated at 18c and reflected to the hydrophones on cable 10 to obtain a record representing the seismic interface in a vertical plane passing through the line of reflections 74 of waves passing to the cable 10. It will thus be apparent that the equipment disclosed in FIGS. 1 to 5 is capable of being used in various ways.

Figure 6:
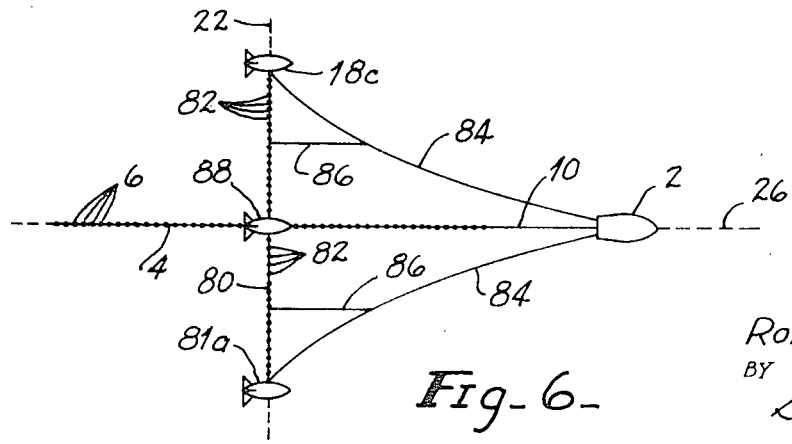
FIG. 6 is a plan view illustrating an alternative arrangement of the impulse producing and echo receiving means which may be employed in the practice of the present invention.

It is also possible to present the echo responsive elements in various arrangements extending in two directions within a horizontal plane above the surface of the area under survey. Thus as shown in FIGS. 6 and 7, the boat 2 may be used to tow a longitudinal spread 4 of hydrophones 6 secured to a cable 10. A cross or transverse spread may then be used and embody a cable 80 having hydrophones 82 carried thereby. The cross spread is preferably maintained in a position at right angles to the longitudinal spread 4 by paravanes 81a and 81c and if desired intermediate connectors 86 may be employed. The cable 80 of the cross spread is connected to the recording equipment on the boat 2 by electrical cables 84.

When using the arrangement shown in FIG. 6, a single impulse generating device 88 may be used and as shown in FIG. 7, the impulse generator may be located at the intersection of the two spreads 4 and 80 or at any other point spaced horizontally from multiple points on the two cable spreads. The elastic waves generated at 88 travel downwardly and outwardly and are represented by their limiting recordable ray paths, 83, 85, 87 and 89. The rays are reflected from seismic interface 30 at points 83a, 85a, 87a and 89a and detected by the hydrophones at the distal ends of seismic cables 4 and 80. Elastic waves reflected at the intersection of nearly vertical planes through seismic cables 4 and 80 with the seismic interface 30 and contained within the points 83a, 85a, 87a and 89a are detected by hydrophones 6 and 82. Data obtained from cables 4 and 80 is transcribed by conventional means on separate recorders and the cycle is repeated with the generation of another impulse at 88 when the reflected energy is sufficiently attenuated or when the survey ship has proceeded along its traverse a desired distance. Thus it is possible to carry out repeated cycles to obtain records of the reflected impulses representing a plurality in intersecting vertical planes, thereby defining the true inclination of the seismic interface of the area under survey, whereas it has heretofore only been possible to determine the apparent inclination in two dimensions while making a single traverse.

In a like manner, other two dimensional arrangements of sensing elements within a horizontal plane can be provided by the use of multiple spreads connected to recording instruments for developing three dimensional records of the profiles of areas under survey. As shown in FIG. 8, such spreads may be arranged in three parallel lines extending parallel to the direction of transverse of the area under survey, and the three records which are obtained can be utilized to establish a three dimensional profile or the seismic interface of the area under survey.

In any of the various forms and arrangements employed in the practice of the present invention, it is desirable to establish and maintain the impulse generating means and the sensing or echo responsive means in fixed and predetermined relative positions during the recording operations. This may be achieved to the extent heretofore accomplished in conventional seismic surveys by the use of conventional paravanes. However, as shown in FIG. 9, the use of a conventional spread of hydrophones, located in a single dimension of a horizontal plane, is subject to error due to the set and drift or displacement of the spread by marine currents at the successive times when shots or impulses are generated for recording purposes.

In accordance with a preferred embodiment of the present invention it is possible to overcome the foregoing source of error and to compensate for any deviations of the paravanes, elements or devices from predetermined positions. Thus, as shown in FIGS. 10, 11 and 12, the cable 90 by which any portion of the arrangement of impulse generating and echo sensing means is supported may be provided with one or more paravanes 92 located at suitable points in the assembly. These paravanes are provided with rudders and elevators or other steerable means, diagrammatically indicated at 94 in FIG. 11, 12 and 13. In addition, the paravanes are provided with radar reflectors or the like 96 by which the position of the paravane, and the various elements or devices connected thereto, can be established and maintained. For this purpose, as represented in FIG. 13, a radar control means 98 carried by the towing ship is arranged to respond to signals reflected from the radar reflector 96 on the paravane. The responses thus obtained are utilized as correction factors and are transmitted to a steering motor 100 through cable 102 to actuate the steering motor 100. In this way, the various paravanes may be controlled to maintain them in predetermined and accurate positions with respect to each other. The seismic means are thereby held in such consistent and related positions during traverse of the area under survey that the records obtained will be capable of ready and accurate correlation and interpretation.

The mechanical and electrical devices employed in the paravane control equipment illustrated in FIG. 13 may be of any conventional type known in the industry and exemplified by those shown and described in U.S. Pat. Nos. 2,960,960; 2,997,689 and 3,125,980. In a similar way, the recording instruments represented in FIGS. 4 and 5 may be any of those known and conventional types now employed or acceptable in the art of seismic recording and surveying equipment.

It will thus be apparent that the various elements and combinations employed in the practice of the present invention are capable of many variations and changes in the application thereof. For example, the present invention may be used in accurately charting the ocean floor or for locating submerged bodies. In view thereof, it should be understood that the particular embodiments of the invention shown in the drawings and described above are intended to be illustrative only and are not intended to limit the scope of the invention.

I claim:

1. Equipment for use in marine seismic surveying, including a plurality of echo responsive elements; a vessel for towing said echo responsive elements; vehicle means associated with said echo responsive elements to maintain said echo responsive elements in a predetermined array, wherein said elements are spaced apart in two directions in a generally horizontal plane; said vehicle means operable to correct the positions of said echo responsive elements in response to signals transmitted between said vessel and said vehicle means; at least one impulse generating device located in a predetermined position with respect to said array and spaced apart in two directions from at least a portion of said echo responsive elements; and means for separately recording the echoes of each impulse generated by said device and received by said echo responsive elements as the separately resolved dominant reflections from points located in two distinct planes disposed at an angle to each other and positioned substantially vertically with respect to said horizontal plane.

2. Equipment as defined in claim 1 wherein said echo responsive elements are arranged in at least two substantially straight lines in said common horizontal plane.

3. Equipment as defined in claim 1 wherein said echo responsive elements are arranged in two straight lines extending substantially at right angles to each other in said common horizontal plane.

4. Equipment as defined in claim 1 wherein said echo responsive means are located in at least two parallel rows extending longitudinally of the direction of traverse of the area under survey.

5. Equipment as defined in claim 1, wherein the echo responsive elements are so arranged and the reflections so recorded as to yield substantially parallel records sufficiently displaced in two directions of a horizontal plane to reveal any differences in travel time due to inclination of the strata beneath the area under survey.

6. Equipment as defined in claim 1 wherein said vehicle means are connected to said impulse generating devices and echo responsive elements and are operable to maintain said devices and elements in substantially fixed and predetermined positions with respect to each other during traverse of said equipment over an area under survey.

7. Equipment as defined in claim 6 wherein said vehicle means include paravanes having rudders, position indicating means are mounted on said paravanes, and rudder actuating means responsive to deviation of said position indicating means from said predetermined position are connected to said actuating means to correct such deviation.

8. Equipment as defined in claim 6 wherein said vehicle means include paravanes having rudders and provided with signal reflectors connected thereto, a source of signal impulses, and rudder actuating means responsive to deviation of said signal reflectors from predetermined positions with respect to said source of signal impulses to correct such deviation.

9. Equipment as defined in claim 1 wherein a plurality of spaced impulse generating devices are provided, and means are employed for successively actuating the same.

10. Equipment as defined in claim 9 wherein means are provided for actuating said impulse generating devices successively to produce a separate record of the impulses received by said echo responsive elements from each of said impulse generating devices.

11. Equipment as defined in claim 10 wherein means are provided for successively producing sets of records, each of which sets includes a record of of the echoes received by said echo responsive elements following the generation of an impulse by each of said impulse generating device.

12. A method for conducting marine seismic exploration comprising the steps:
providing a plurality of echo responsive elements;
arranging the echo responsive elements into a horizontally extending array, with the elements disposed in predetermined space relationship with respect to each other in two directions within the horizontal plane;
towing the array of echo responsive elements over a surface to be explored by means of a vessel;
maintaining the predetermined space relationship of the echo responsive elements by vehicle means; and
maneuvering the vehicle means to correct any deviations of the positions of the echo responsive elements of the predetermined spaced relationship thereof.

13. The method as defined in claim 12 wherein a plurality of impulse generating means are employed and are actuated at successive intervals to produce a set of records indicating the characteristics of the area under survey in an orthogonal plane substantially normal to the predetermined direction of movement over said area.